United States Patent
Takagi et al.

(10) Patent No.: US 10,994,347 B2
(45) Date of Patent: May 4, 2021

(54) METHOD FOR MANUFACTURING CENTRIFUGAL ROTARY MACHINE AND METHOD FOR MANUFACTURING IMPELLER THEREOF

(71) Applicant: MITSUBISHI HEAVY INDUSTRIES COMPRESSOR CORPORATION, Tokyo (JP)

(72) Inventors: Hiroki Takagi, Hiroshima (JP); Yoshiki Tazawa, Hiroshima (JP); Yusuke Kawai, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 243 days.

(21) Appl. No.: 16/089,109

(22) PCT Filed: Sep. 5, 2016

(86) PCT No.: PCT/JP2016/075979
§ 371 (c)(1),
(2) Date: Sep. 27, 2018

(87) PCT Pub. No.: WO2018/042653
PCT Pub. Date: Mar. 8, 2018

(65) Prior Publication Data
US 2019/0126364 A1 May 2, 2019

(51) Int. Cl.
*B23C 3/18* (2006.01)
*B23C 5/10* (2006.01)
(Continued)

(52) U.S. Cl.
CPC .............. *B23C 3/18* (2013.01); *B23C 5/1009* (2013.01); *B23C 5/1081* (2013.01);
(Continued)

(58) Field of Classification Search
CPC ....... B23C 3/18; B23C 5/1009; B23C 5/1081; B23C 2215/56; F04D 29/023;
(Continued)

(56) References Cited

U.S. PATENT DOCUMENTS 2,396,488 A    3/1946   Bolas et al.
2,480,807 A *   8/1949   De Vlieg .................. B23C 3/18
                                                         409/84
(Continued)

FOREIGN PATENT DOCUMENTS

EP    0992310 A2   4/2000
EP    1396309 A1   3/2004
(Continued)

OTHER PUBLICATIONS

International Search Report issued in corresponding International Patent Application No. PCT/JP2016/075979, dated Nov. 15, 2016 (4 pages).

(Continued)

*Primary Examiner* — Sarang Afzali
*Assistant Examiner* — Darrell C Ford
(74) *Attorney, Agent, or Firm* — Osha Bergman Watanabe & Burton LLP

(57) ABSTRACT

When a closed type impeller is manufactured from one block, a rough cutting process of cutting a flow path region of a block using a rough cutting tool, and a residue-cutting process of cutting a cutting residue in the cutting process using a residue-cutting tool are executed. The residue-cutting tool has a tool main body having a blade formed on an outer periphery thereof, and a handle having the tool main body fixed to a distal end thereof. A maximum outer diameter of the tool main body is larger than a minimum (Continued)

outer diameter of the handle. Further, the tool main body has a rear blade directed in a direction including a tool rear side component.

13 Claims, 11 Drawing Sheets

(51) Int. Cl.
B23P 15/00 (2006.01)
F04D 29/02 (2006.01)
F04D 17/12 (2006.01)
F04D 29/28 (2006.01)

(52) U.S. Cl.
CPC .......... B23P 15/006 (2013.01); F04D 17/122 (2013.01); F04D 29/023 (2013.01); F04D 29/284 (2013.01); B23C 2215/56 (2013.01); F05D 2230/53 (2013.01); F05D 2250/193 (2013.01); F05D 2250/29 (2013.01)

(58) Field of Classification Search
CPC .... F04D 17/122; F04D 29/284; B23P 15/006; F05D 2250/29; F05D 2230/53; F05D 2250/193; Y10T 29/49316; Y10T 29/4932; Y10T 29/49321; Y10T 29/49323; Y10T 29/49325; Y10T 29/49329; Y10T 29/49332
USPC .......... 29/889, 889.2, 889.21, 889.22, 889.4, 29/889.6
See application file for complete search history.

(56) References Cited

U.S. PATENT DOCUMENTS

| 5,438,755 | A  | * | 8/1995  | Giberson | .............. | B23P 15/006 |
|           |    |   |         |          |               | 29/558      |
| 10,821,520| B2 | * | 11/2020 | Kawahara | .............. | B33Y 80/00  |

| 2003/0039547 | A1 |   | 2/2003  | Bourgy et al. |         |              |
|--------------|----|---|---------|---------------|---------|--------------|
| 2004/0006870 | A1 | * | 1/2004  | Sasu          | ....... | F04D 29/444  |
|              |    |   |         |               |         | 29/889.2     |
| 2004/0093727 | A1 |   | 5/2004  | Mola et al.   |         |              |
| 2006/0026816 | A1 |   | 2/2006  | Riall et al.  |         |              |
| 2006/0060053 | A1 | * | 3/2006  | Tanaka        | ....... | B23C 5/1036  |
|              |    |   |         |               |         | 83/663       |
| 2008/0104837 | A1 | * | 5/2008  | Ikeda         | ....... | F04D 29/20   |
|              |    |   |         |               |         | 29/889       |
| 2013/0294919 | A1 | * | 11/2013 | Elfizy        | ....... | B24B 27/0084 |
|              |    |   |         |               |         | 416/223 R    |
| 2014/0050585 | A1 | * | 2/2014  | Kawanishi     | ....... | F04D 29/28   |
|              |    |   |         |               |         | 416/177      |
| 2014/0133926 | A1 | * | 5/2014  | Budda         | ....... | B23C 5/1009  |
|              |    |   |         |               |         | 407/54       |
| 2015/0097305 | A1 | * | 4/2015  | Hufschmied    | ....... | B23C 5/1009  |
|              |    |   |         |               |         | 264/16       |
| 2015/0298225 | A1 | * | 10/2015 | Ueno          | ....... | B64C 1/12    |
|              |    |   |         |               |         | 244/129.1    |

FOREIGN PATENT DOCUMENTS

| EP | 2564962 A1    | 3/2013  |
|----|---------------|---------|
| JP | 2003-120203 A | 4/2003  |
| JP | 2004-009158 A | 1/2004  |
| JP | 2004-092650 A | 3/2004  |
| JP | 2008-509012 A | 3/2008  |
| JP | 2010-269416 A | 12/2010 |
| JP | 2014-040838 A | 3/2014  |
| JP | 2015-206368 A | 11/2015 |
| JP | 2015-226953 A | 12/2015 |
| WO | 2011125080 A1 | 10/2011 |

OTHER PUBLICATIONS

Written Opinion of the International Searching Authority issued in corresponding International Patent Application No. PCT/JP2016/075979, dated Nov. 15, 2016 (12 pages).

* cited by examiner $Dt1 \geqq Dt2$ , $Ds1 \geqq Ds2$

Dt2≧Dt3 , Ds2>Ds3

METHOD FOR MANUFACTURING CENTRIFUGAL ROTARY MACHINE AND METHOD FOR MANUFACTURING IMPELLER THEREOF

TECHNICAL FIELD

The present invention relates to a method for manufacturing a centrifugal rotary machine and a method for manufacturing an impeller thereof.

BACKGROUND ART

A closed impeller as an impeller of a centrifugal rotary machine is known. The closed impeller includes a disc-shaped disc around an axis line, a plurality of blades provided on an outer peripheral surface of the disc to be spaced apart from each other in a circumferential direction with respect to the axis line, and a cover for sandwiching the plurality of blades between the disc and the cover. With this impeller, a flow path is formed between the plurality of blades between the disc and the cover. This flow path is gradually bent outward in the radial direction with respect to the axis line, while facing axially rearward from an inlet of the flow path. Furthermore, when viewed from the axial direction, this flow path is bent toward an opposite side with respect to a rotation direction of the impeller, while being directed outward in the radial direction from the inlet of the flow path.

The following Patent Literature 1 discloses a method for manufacturing the closed impeller explained above from one block. In the manufacturing method, a cutting tool is put into the block from an inlet region in the block serving as the inlet of the impeller to cut the block, and the cutting tool is put into the block from an outlet region in the block serving as the outlet of the impeller to cut the block, thereby forming a bent flow path in the block.

CITATION LIST

Patent Literature

[Patent Literature 1]
Japanese Unexamined Patent Application, First Publication No. 2014-040838

SUMMARY OF INVENTION

Technical Problem

In some cases, a radius of curvature of bending of the flow path of the centrifugal rotary machine may be relatively smaller than an opening area of the inlet or the outlet, depending on the type. In this case, even if the block is cut by the method described in the above-mentioned Patent Literature 1, it is difficult to form a desired flow path in the block.

Therefore, an object of the present invention is to provide a method for manufacturing a centrifugal rotary machine, and a method for manufacturing an impeller thereof capable of forming a flow path in the block for manufacturing the impeller, even when the radius of curvature of bending of the flow path in the closed impeller is relatively smaller than the opening area of the inlet or the outlet.

Solution to Problem

A method for manufacturing an impeller according to a first aspect of the invention for achieving the above object is a method for manufacturing an impeller of a centrifugal rotary machine in which the impeller is formed from one block, the impeller having a disc-shaped disc around an axis line, a plurality of blades disposed on an outer peripheral surface of the disc to be spaced apart from each other in a circumferential direction with respect to the axis line; and a cover which sandwiches the plurality of blades between the disc and the cover, a flow path being formed between the disc and the cover and between the plurality of blades, the flow path causing the fluid flowing in from an axial direction front side which is one side in an axial direction in which the axis line extends, to flow outward in a radial direction with respect to the axis line. The method for manufacturing the impeller includes executing a flow path-cutting process of cutting a flow path region serving as the flow path in the block using a plurality of types of tools different from each other. The flow path-cutting process includes a rough cutting process of cutting using a rough cutting tool which is one of the plurality of tools, and a residue-cutting process of cutting the cutting residue in the rough cutting process using a residue-cutting tool which is one of the plurality of tools. Each of the plurality of tools used in the flow path-cutting process has a tool main body having a blade formed at least on an outer periphery around a tool axis line, and a handle to which the tool main body is fixed, and which is long in a tool axis direction in which the tool axis line extends, around the tool axis line. A maximum outer diameter of the tool main body in the residue-cutting tool is larger than a minimum outer diameter of the handle in the residue-cutting tool, and the tool main body in the residue-cutting tool has a rear blade directed in a direction including a tool rear side component which is a side of the handle with respect to the tool main body in the residue-cutting tool.

According to the manufacturing method, even if the radius of curvature of bending of the flow path in the impeller is relatively smaller than the opening area of the inlet or the outlet, the portion remaining after the execution of the rough cutting process can be cut with the residue-cutting tool. Therefore, according to the manufacturing method, even when the radius of curvature of bending of the flow path in the impeller is relatively smaller than the opening area of the inlet or the outlet, the flow path can be formed in the block.

In a method for manufacturing an impeller according to a second aspect of the invention for achieving the above object, in the method for manufacturing the impeller of the first aspect, the residue-cutting process includes a process of cutting the cutting residue in the rough cutting process by the rear blade of the residue-cutting tool by moving the residue-cutting tool in a direction including the tool rear side component while rotating the residue-cutting tool.

In the manufacturing method, after the residue-cutting tool is set at a predetermined position in the flow path region in the block, the pulling and cutting process is executed by moving the residue-cutting tool in the direction including the tool rear side component while rotating the residue-cutting tool. Therefore, according to the manufacturing method, it is possible to reduce the possibility of contact of the handle with the portion of the cutting residue or an opening edge of the inlet or an opening edge of the outlet during cutting.

In a method for manufacturing an impeller according to a third aspect of the invention for achieving the above object, in the method of manufacturing the impeller of the first or second aspect, an overhanging amount, which is a distance from an outer peripheral surface at a position which is a minimum outer diameter of the handle to a position having a maximum outer diameter of the outer periphery of the tool main body in a direction perpendicular to the tool axis line, is maximum in the residue-cutting tool among the plurality of tools.

According to the manufacturing method, even if the radius of curvature of bending of the flow path in the impeller is relatively smaller than the opening area of the inlet or the outlet, the part remaining by execution of the rough cutting process can be cut with the residue-cutting tool.

In a method for manufacturing an impeller according to fourth aspect of the present invention for achieving the above object, in the method for manufacturing the impeller according to any one of the first to the third aspects, the minimum outer diameter of the handle is minimum in the residue-cutting tool among the plurality of tools.

In a method for manufacturing an impeller according to a fifth aspect of the invention for achieving the above object, in the method for manufacturing the impeller according to any one of the first to the fourth aspects, the maximum outer diameter of the tool main body is minimum in the residue-cutting tool among the plurality of tools.

In the manufacturing method, it is possible to cut a portion having a small radius of curvature in the impeller, for example, a corner portion between the disc and the blade or a corner portion between the cover and the blade, by the residue-cutting tool.

In a method for manufacturing an impeller according to a sixth aspect of the present invention for achieving the above object, in the method for manufacturing the impeller according to any one of the first to fifth aspects, the tool main body of the residue-cutting tool has the blade formed in a range of 200° or more within a virtual plane including the tool axis line.

In a method for manufacturing an impeller according to a seventh aspect of the present invention for achieving the above object, in the method for manufacturing the impeller according to any one of the first to the sixth aspects, the tool main body of the residue-cutting tool has the blade formed in a range of 240° or more within a virtual plane including the tool axis line.

In a method for manufacturing an impeller according to an eighth aspect of the present invention for achieving the above object, in the method for manufacturing the impeller according to any one of the first to the seventh aspects, the flow path-cutting process includes an intermediate/finishing cutting process of cutting the cutting residue in the rough cutting process using the intermediate/finishing cutting tool which is one of the plurality of tools after the rough cutting process, and the residue-cutting process includes cutting the cutting residue in the intermediate/finishing cutting process after the intermediate/finishing cutting process.

In a method for manufacturing an impeller according to a ninth aspect of the present invention for achieving the above object, in the method for manufacturing the impeller of the eighth aspect, the outer diameter of the distal end of the handle in the intermediate/finishing cutting tool is equal to or less than the outer diameter of the distal end of the handle in the rough cutting tool.

In the manufacturing method, it is possible to easily cut the cutting residue in the rough cutting process.

In a method for manufacturing an impeller according to a tenth aspect of the present invention for achieving the above object, in the method for manufacturing the impeller of the eighth or ninth aspect, the maximum outer diameter of the tool main body in the intermediate/finishing cutting tool is equal to or less than the maximum outer diameter of the tool main body in the rough cutting tool.

In the manufacturing method, it is possible to easily cut the cutting residue in the rough cutting process.

In a method for manufacturing an impeller according to an eleventh aspect of the present invention for achieving the above object, in the method for manufacturing the impeller according to any one of the eighth to the tenth aspects, the rough cutting process includes a first rough cutting process of cutting the flow path region by inserting the rough cutting tool into the block from one of an inlet region in the block serving as an inlet through which the fluid flows in the impeller and an outlet region in the block serving as an outlet from which the fluid flows out in the impeller; and a second rough cutting process of cutting the flow path region by inserting the rough cutting tool into the block from the other region among the outlet region and the inlet region after the first rough cutting process, the intermediate/finishing cutting process includes a first intermediate/finishing cutting process of cutting the flow path region by inserting the intermediate/finishing cutting tool into the block from the other region in the block after the second rough cutting process; and a second intermediate/finishing cutting process of cutting the flow path region by inserting the intermediate/finishing cutting tool into the block from the one region in the block after the first intermediate/finishing cutting process, and the residue-cutting process includes a first residue-cutting process of cutting the flow path region by inserting the residue-cutting tool into the block from the one region in the block after the second intermediate/finishing cutting process.

In the manufacturing method, both the second rough cutting process and the first intermediate/finishing cutting process include inserting the tool into the flow path region from the other region among the outlet region and the inlet region. Therefore, in the manufacturing method, after the second rough cutting process, the first intermediate/finishing cutting process can be executed without changing the direction of the block with respect to the table of the machine tool. In the manufacturing method, both the second intermediate/finishing cutting process and the first residue-cutting process include inserting the tool from the one of the outlet region and the inlet region into the flow path region. Therefore, in the manufacturing method, the first residue-cutting process can be executed without changing the direction of the block with respect to the table of the machine tool after the second intermediate/finishing cutting process.

In a method for manufacturing an impeller according to a twelfth aspect of the present invention for achieving the above object, in the method for manufacturing the impeller according to any one of the eighth to eleventh aspects, the intermediate/finishing cutting tool is a ball end mill.

In a method for manufacturing an impeller according to a thirteenth aspect of the invention for achieving the above object, in the method for manufacturing the impeller according to any one of the first to the twelfth aspects, the rough cutting tool is a radius end mill.

In a method for manufacturing an impeller according to a fourteenth aspect of the present invention for achieving the above object, in the method for manufacturing an impeller according to any one of the first to the thirteenth aspects, the residue-cutting tool is a lollipop mill.

A method for manufacturing a centrifugal rotary machine according to a fifteenth aspect of the invention for achieving the above object includes executing the method for manufacturing the impeller according to any one of the first to the fourteenth aspects; and executing a preparation process of preparing a component including a rotary shaft on which the impeller is mounted and which extends around the axis line, and a casing which covers the impeller, and an assembling process of combining the impeller and the component including the rotary shaft and the casing.

Advantageous Effects of Invention

According to an aspect of the present invention, even when the radius of curvature of bending of the flow path in the closed impeller is relatively smaller than the opening area of the inlet or the outlet, it is possible to form the flow path in the block for manufacturing the impeller.

DESCRIPTION OF EMBODIMENTS

Hereinafter, an embodiment of a method for manufacturing a centrifugal rotary machine according to the present invention will be described with reference to the drawings.

Figure 1:
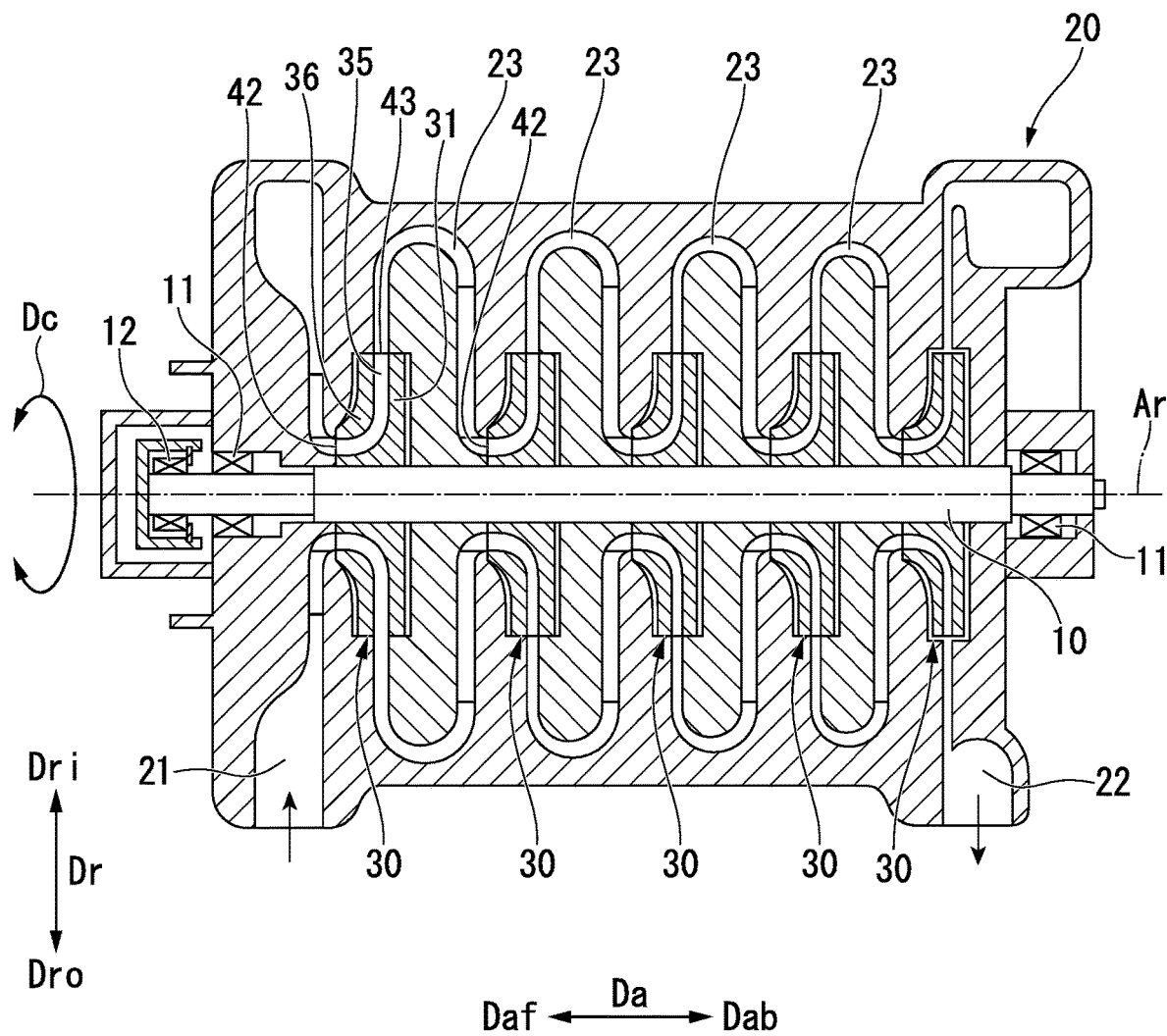
FIG. 1 is a schematic cross-sectional view of a centrifugal rotary machine according to one embodiment of the present invention.

The centrifugal rotary machine of the present embodiment is a centrifugal multi-stage compressor. As illustrated in FIG. 1, the centrifugal multi-stage compressor includes a rotary shaft 10, a casing 20, a plurality of impellers 30, a radial bearing 11, and a thrust bearing 12. The rotary shaft 10 has a columnar shape around an axis line Ar and rotates about the axis line Ar. Both the radial bearing 11 and the thrust bearing 12 are fixed to the casing 20 and support the rotary shaft 10 in a rotatable manner. The plurality of impellers 30 are aligned in an axial direction Da in which the axis line Ar extends, and are fixed to an outer circumferential side of the rotary shaft 10. The plurality of impellers 30 rotate integrally with the rotary shaft 10 about the axis line Ar. Each impeller 30 has a disc 31, a plurality of blades 35, and a cover 36. Here, one side in the axial direction Da is set as an axial direction front side Daf, and the other side in the axial direction Da is set as an axial direction rear side Dab. Further, a radial direction with respect to the axis line Ar is simply set as a radial direction Dr, a side approaching the axis line Ar in the radial direction Dr is set as a radial direction inner side Dri, and a side away from the axis line Ar in the radial direction Dr is set as a radial direction outer side Dro. Further, a circumferential direction with respect to the axis line Ar is simply referred to as the circumferential direction Dc.

Figure 2:
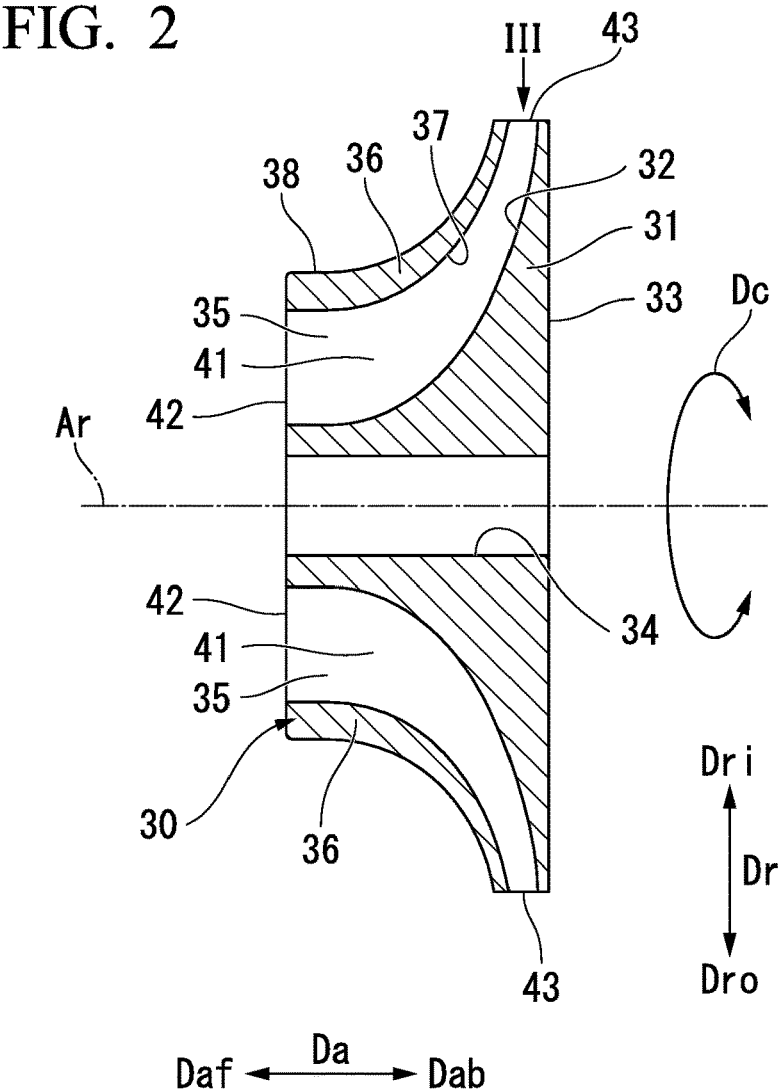
FIG. 2 is a cross-sectional view of an impeller according to one embodiment of the present invention.

As illustrated in FIG. 2, the disc 31 gradually expands in diameter from the axial direction front side Daf toward the axial direction rear side Dab. Therefore, in a portion of the outer peripheral surface 32 of the disc 31 on the axial direction front side Daf, a direction component directed toward the axial direction rear side Dab is greater than a component directed toward the radial direction outer side Dro. Further, in a portion of the outer peripheral surface 32 on the axial direction rear side Dab, a direction component directed toward the radial direction outer side Dro is greater than a direction component directed toward the axial direction rear side Dab. A back surface 33 facing the axial direction rear side Dab is formed on the disc 31. Furthermore, a shaft hole 34 penetrating on the axis line Ar in the axial direction Da is formed in the disc 31. The rotary shaft 10 is mounted on the shaft hole 34. The plurality of blades 35 are provided on the outer peripheral surface 32 of the disc 31 at intervals in the circumferential direction Dc. As viewed from the axial direction Da, each of the blades 35 is bent to be gradually directed toward a counter-rotation side with respect to the rotation direction of the impeller 30 from the portion of the radial direction inner side Dri toward the radial direction outer side Dro. The cover 36 is disposed to face the outer peripheral surface 32 of the disc 31 and sandwiches the plurality of blades 35 between the disc 31 and the cover 36. The inner peripheral surface 37 of the cover 36 faces the outer peripheral surface 32 of the disc 31. In a portion of the inner peripheral surface 37 of the cover 36 on the axial direction front side Daf, a direction component directed toward the axial direction rear side Dab is greater than a component directed toward the radial direction outer side Dro. Further, in a portion of the inner peripheral surface 37 on the axial direction rear side Dab, a direction component directed toward the radial direction outer side Dro is greater than a direction component directed toward the axial direction rear side Dab. An outer peripheral surface 38 in a back-to-back relationship with the inner peripheral surface 37 is formed on the cover 36.

An impeller inner flow path 41 which causes the fluid flowing in from the axial direction front side Daf to flow out to the radial direction outer side Dro is formed between the disc 31 and the cover 36 and between the plurality of blades 35. Therefore, the inlet 42 of the impeller inner flow path 41 opens toward the axial direction front side Daf. Further, the outlet 43 of the impeller inner flow path 41 opens toward the radial direction outer side Dro. The impeller inner flow path 41 is gradually bent toward the radial direction outer side Dro with respect to the axis line Ar, while being directed from the inlet 42 of the impeller inner flow path 41 to the axial direction rear side Dab. Further, when viewed in the axial direction Da, the impeller inner flow path 41 is gradually bent toward the opposite side with respect to the rotation direction of the impeller 30, while being directed from the inlet 42 of the impeller inner flow path 41 toward the radial direction outer side Dro.

Figure 3:
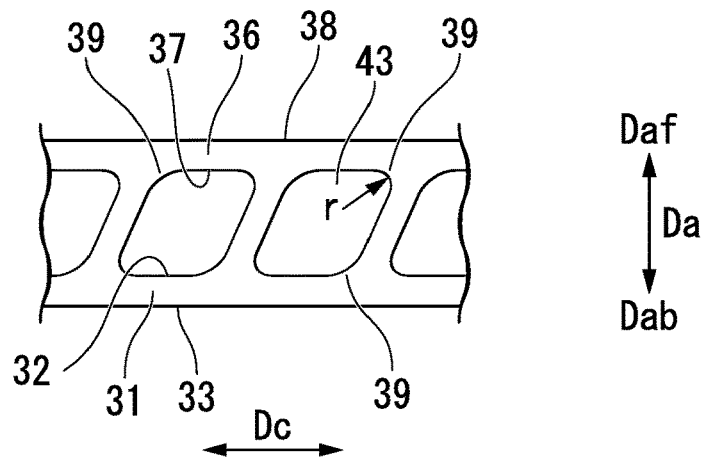
FIG. 3 is a diagram as seen in a direction of arrow III in FIG. 2.

As illustrated in FIG. 3, the corner portions of the disc 31 and the blade 35 and the corner portions of the cover 36 and the disc 31 form fillet portions 39. The fillet portions 39 have a smooth recessed shape from the inner side to the outer side of the impeller inner flow path 41.

As illustrated in FIG. 1, the casing 20 covers the rotary shaft 10, the respective bearings 11 and 12, and the plurality of discs 31. A suction flow path 21, a discharge flow path 22, and an intermediate flow path 23 are formed in the casing 20. The suction flow path 21 guides the fluid from the outside into the impeller inner flow path 41 of the impeller 30 disposed on the side closest to the axial direction front side Daf. The discharge flow path 22 guides the fluid from the impeller 30 disposed on the side closest to the axial direction rear side Dab to the outside. The intermediate flow path 23 guides the fluid that flows out of the outlet 43 of one impeller 30 from the inlet 42 of the other impeller 30 adjacent to the one impeller 30 in the axial direction rear side Dab into the impeller inner flow path 41 of the other impeller 30.

Figure 4:
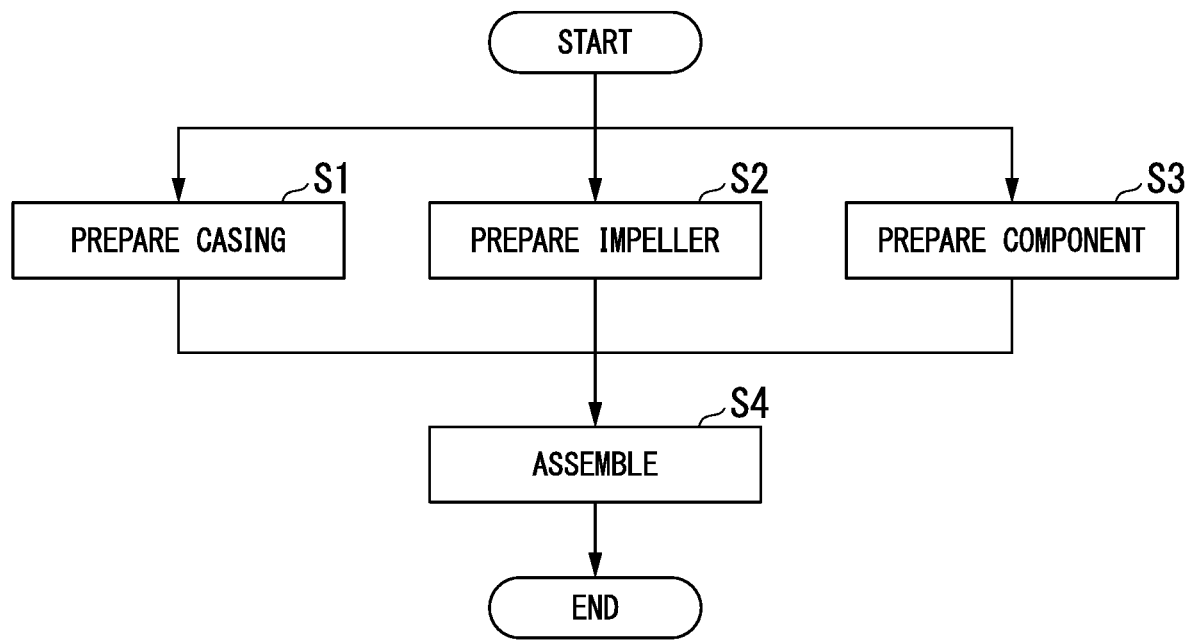
FIG. 4 is a flowchart illustrating a manufacturing procedure of the centrifugal rotary machine according to one embodiment of the present invention.

Next, the manufacturing procedure of the above-described centrifugal multi-stage compressor will be described with reference to the flowchart illustrated in FIG. 4.

First, a plurality of components constituting the centrifugal multi-stage compressor are prepared. Here, the casing 20 of the centrifugal multi-stage compression machine is prepared (S1: a casing preparation process), and the impeller 30 of the centrifugal multi-stage compressor is prepared (S2: an impeller preparation process). Furthermore, the rotary shaft 10, the bearings 11 and 12, and components such as a shaft seal (not illustrated) are also prepared (S3: a component preparation process).

Next, the plurality of components prepared above are combined (S4: an assembling process).

The centrifugal multi-stage compressor is completed in this way.

Figure 5:
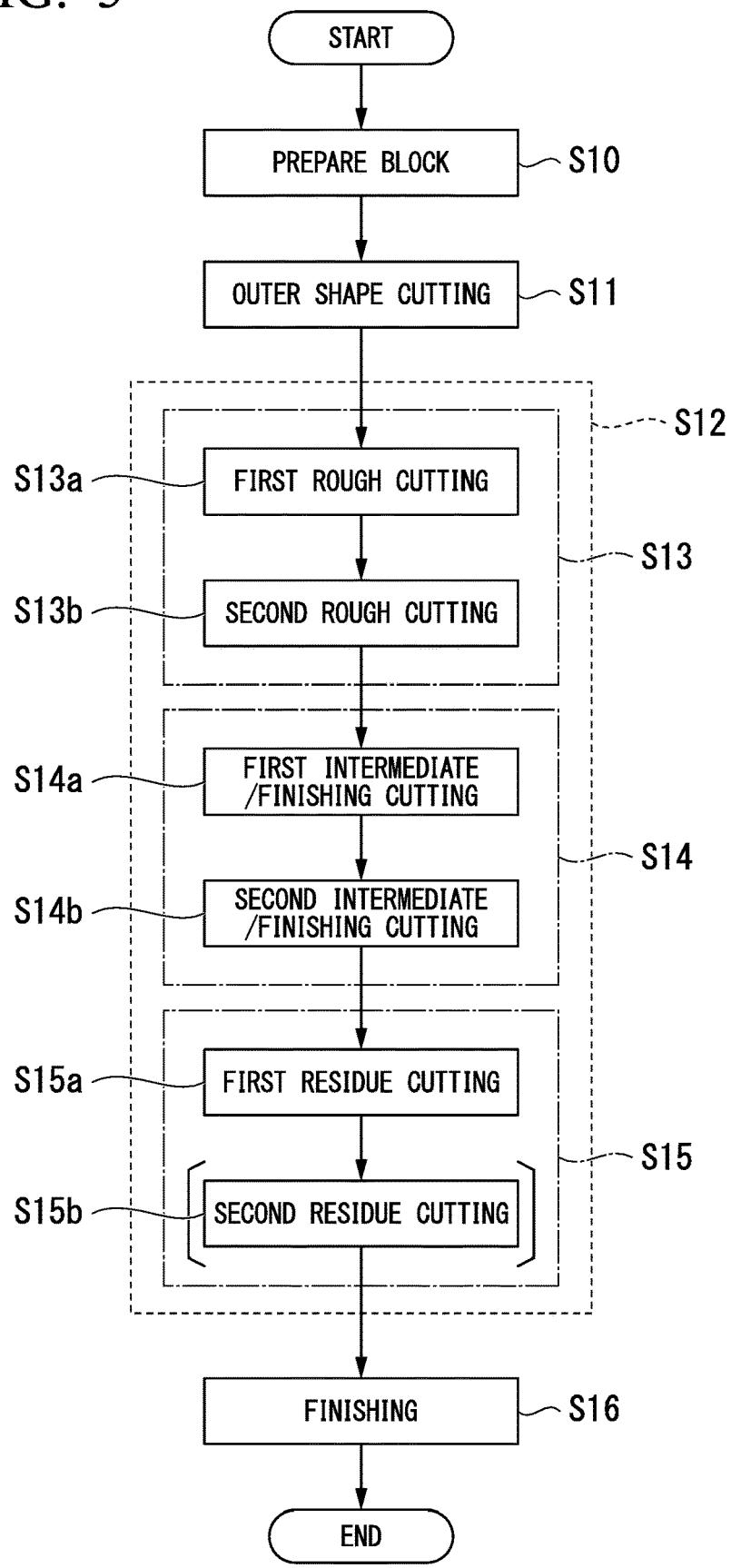
FIG. 5 is a flowchart illustrating a manufacturing procedure of the impeller according to one embodiment of the present invention.

Next, the manufacturing procedure of the impeller 30 in the preparation process (S2) of the impeller 30 will be described in accordance with the flowchart illustrated in FIG. 5.

Figure 9:
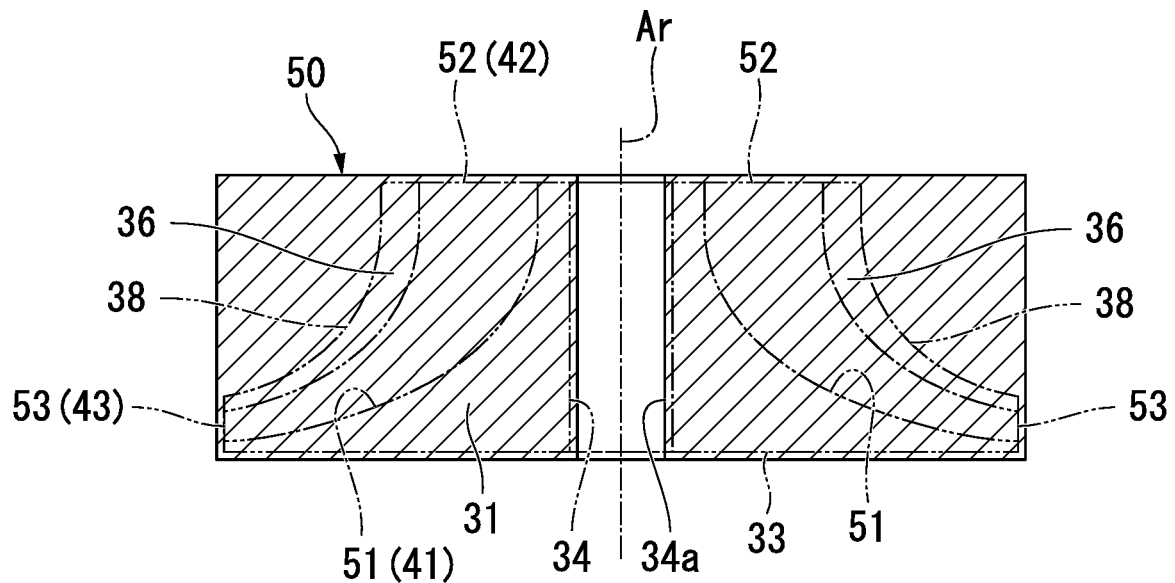
FIG. 9 is a cross-sectional view of an intermediate block according to one embodiment of the present invention.

First, a block larger than an outer shape of the impeller 30 is prepared (S10: a block preparation process). Next, as illustrated in FIG. 9, the outer shape or the like of the block is cut to form an intermediate block 50 (S11: an outer shape-cutting process). In this outer shape-cutting process (S11), the outer shape of the block is cut and a region which is the shaft hole 34 in the block is cut to form the shaft hole 34a. Further, in some cases, the shaft hole 34a may be already formed in the block. In this case, the outer shape-cutting process (S11) for forming the intermediate block 50 from the block may not be executed. Here, in the intermediate block 50, a region which is the impeller inner flow path 41 of the impeller 30 is defined as a flow path region 51. In the intermediate block, a region that is the inlet 42 of the impeller inner flow path 41 is defined as an inlet region 52, and a region that is the outlet 43 of the impeller inner flow path 41 is defined as an outlet region 53.

Next, the intermediate block 50 is cut to form an impeller inner flow path 41 in the intermediate block 50 (S12: a flow path-cutting process). In the flow path-cutting process (S12), the intermediate block 50 is cut using at least three kinds of tools. Each of the tools has a tool main body having a blade formed at least on the outer periphery around the tool axis line At, and a handle to which the tool main body is fixed and which is long in a tool axis direction Dta in which the tool axis line At extends around the tool axis line At.

Figure 6A:
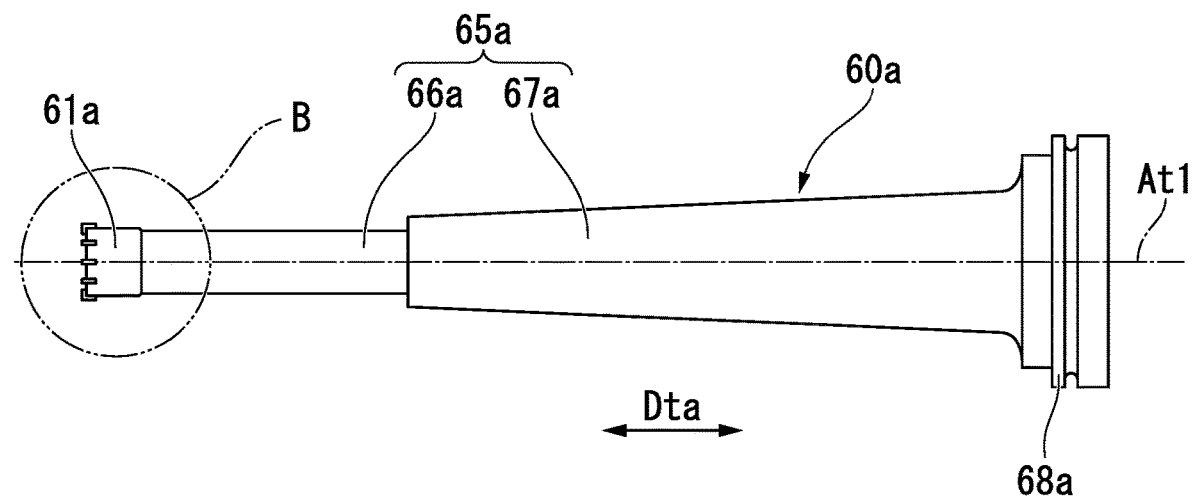
FIG. 6A is a side view of a rough cutting tool according to one embodiment of the present invention.
Figure 6B:
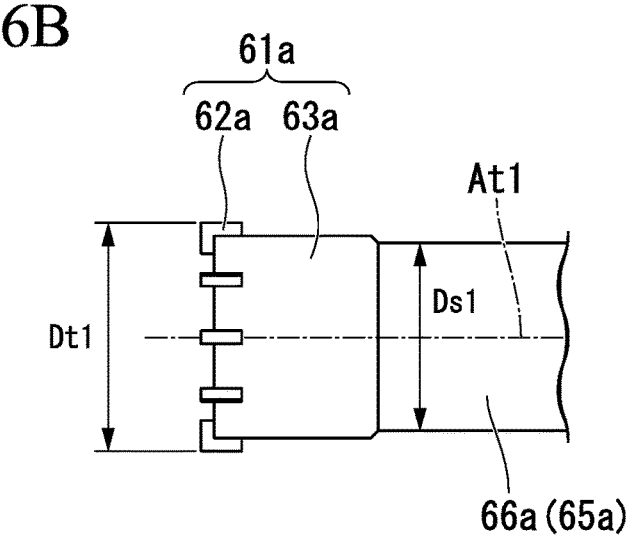
FIG. 6B is an enlarged view of a part B in FIG. 6A.

As illustrated in FIGS. 6A and 6B, the first tool is a rough cutting tool 60a. The rough cutting tool 60a is, for example, a radius end mill. The rough cutting tool 60a has a tool main body 61a, and a handle 65a to which the tool main body 61a is fixed. The tool main body 61a has a columnar head 63a around the tool axis line At1, and a plurality of chips 62a fixed to the outer periphery of the head 63a. The plurality of chips 62a are arranged in the circumferential direction with respect to the tool axis line At1. Blades are formed on each chip 62a. In this tool main body 61a, the head portion and the plurality of blade portions may be integral. The handle 65a has a shank 66a and a holder 67a. Each of the shank 66a and the holder 67a has a long columnar shape extending in the tool axis direction Dta in which the tool axis line At1 extends around the tool axis line At1. Each of the shank 66a and the holder 67a has a distal end and a proximal end which are the ends in the tool axis direction Dta. A head 63a of the tool main body 61a is fixed to the distal end of the shank 66a. The proximal end of the shank 66a is attached to the distal end of the holder 67a. A proximal end 68a of the holder 67a is a portion that is chucked by a machine tool. A maximum outer diameter of the tool main body 61a is Dt1. A shank outer diameter Ds1 is smaller than a minimum outer diameter of the holder 67a. Therefore, the shank outer diameter Ds1 is the minimum outer diameter of the handle 65a. The shank outer diameter Ds1, that is, the minimum outer diameter of the handle 65a, is slightly smaller than the maximum outer diameter Dt1 of the tool main body 61a.

Figure 7A:
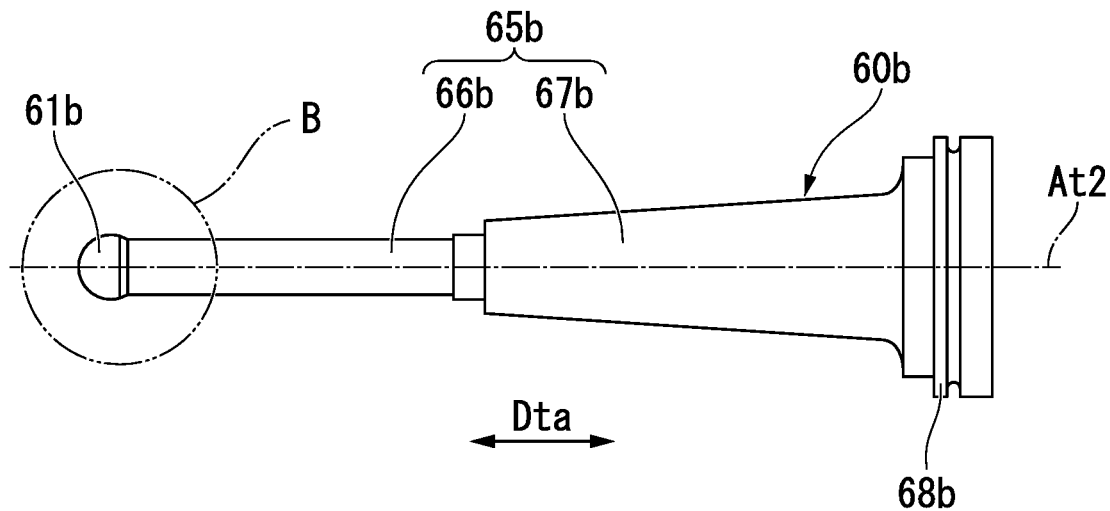
FIG. 7A is a side view of an intermediate/finishing cutting tool according to one embodiment of the present invention.
Figure 7B:
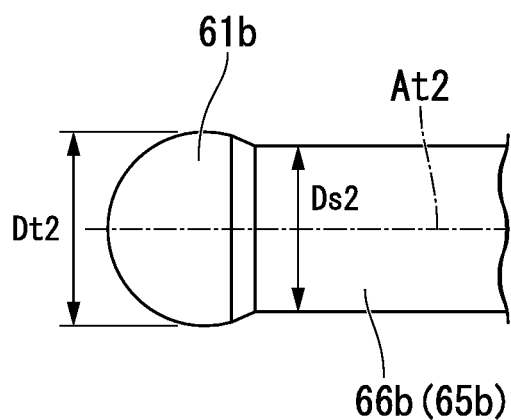
FIG. 7B is an enlarged view of a part B in FIG. 7A.

As illustrated in FIGS. 7A and 7B, the second tool is an intermediate/finishing cutting tool 60b. The intermediate/finishing cutting tool 60b is, for example, a ball end mill. The intermediate/finishing cutting tool 60b has a hemispherical tool main body 61b around the tool axis line At2, and a handle 65b to which the tool main body 61b is fixed. A blade is formed on the hemispherical tool main body 61b. Like the tool main body 61a of the rough cutting tool 60a, the tool main body 61b has a head, and a plurality of chips attached to the head. In the tool main body 61b, the head portion and the plurality of blade portions may also be integrated. The handle 65b has a shank 66b and a holder 67b. Each of the shank 66b and the holder 67b has a columnar shape which is long in the tool axis direction Dta in which the tool axis line Atb extends around the tool axis line At2. Each of the shank 66b and the holder 67b has a distal end and a proximal end which are the ends in the tool axis direction Dta. The tool main body 61b is fixed to the distal end of the shank 66b. The proximal end of the shank 66b is attached to the distal end of the holder 67b. The proximal end 68b of the holder 67b is a portion that is chucked by the machine tool. The maximum outer diameter of the tool main body 61b is Dt2. The maximum outer diameter Dt2 of the tool main body 61b is less than twice (2r) the radius of curvature r (see FIG. 3) of the recessed shape in the fillet portion 39. That is, the maximum radius Dt2 of the tool main body 61b is less than the radius of curvature r of the recessed shape of the fillet portion 39. The shank outer diameter Ds2 is smaller than the minimum outer diameter of the holder 67b. Therefore, the shank outer diameter Ds2 is the minimum outer diameter of the handle 65b. The shank outer diameter Ds2, that is, the minimum outer diameter of the handle 65b, is slightly smaller than the maximum outer diameter Dt2 of the tool main body 61b.

Figure 8A:
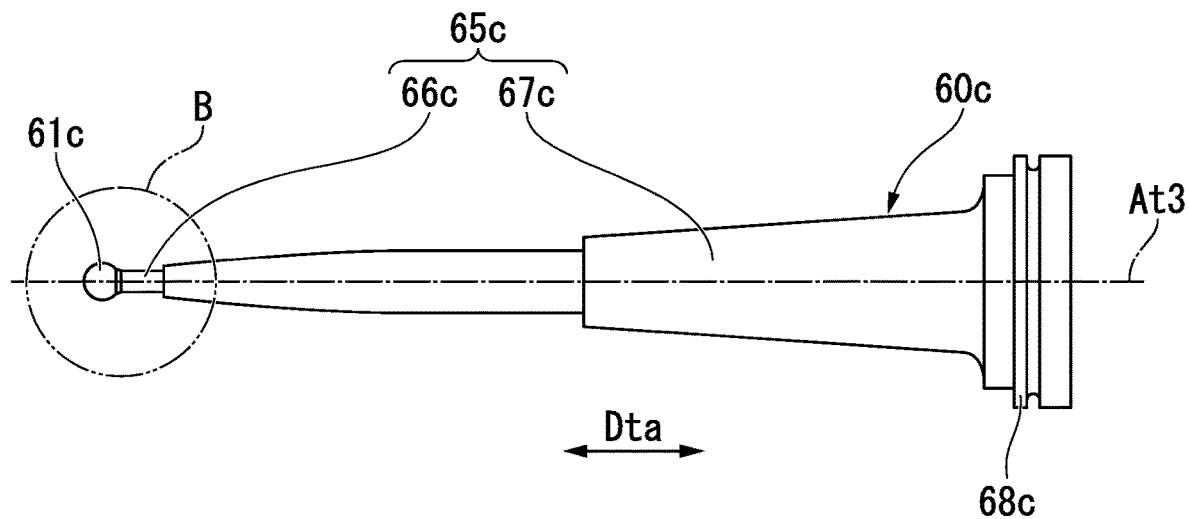
FIG. 8A is a side view of a residue-cutting tool according to one embodiment of the present invention.
Figure 8B:
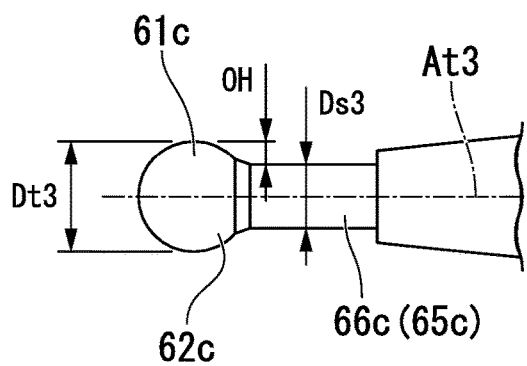
FIG. 8B is an enlarged view of a part B in FIG. 8A.

As illustrated in FIGS. 8A and 8B, the third tool is the residue-cutting tool 60c. The residue-cutting tool 60c is, for example, a lollipop mill. The residue-cutting tool 60c has a spherical segment-shaped tool main body 61c around the tool axis line At3, and a handle 65c to which the tool main body 61c is fixed. Here, the spherical segment shape is the shape of the portion which has the greater volume among the two parts obtained by cutting a sphere with a plane that does not pass through the center of the sphere. A blade is formed on the outer periphery of the spherical segment tool main body 61c. Like the tool main body 61a of the rough cutting tool 60a, the tool main body 61c has a head and a plurality of chips attached to the head. Further, in the tool main body 61c, the head portion and the plurality of blade portions may be integral. The handle 65c has a shank 66c and a holder 67c. Each of the shank 66c and the holder 67c has a columnar shape which is long in the tool axis direction Dta in which the tool axis line Atb extends around the tool axis line At3. Each of the shank 66c and the holder 67c has a distal end and a proximal end that are ends of the tool axial direction Dta. The tool main body 61c is fixed to the distal end of the shank 66c. The proximal end of the shank 66c is attached to the distal end of the holder 67c. The proximal end 68c of the holder 67c is a portion that is chucked by the machine tool. A maximum outer diameter of the tool main body 61c is Dt3. The maximum outer diameter Dt3 of the tool main body 61c, like the maximum outer diameter Dt2 of the aforementioned tool main body 61b, is also less than twice (2r) the radius of curvature r (see FIG. 3) of the recessed shape in the fillet portion 39. That is, the maximum radius Dt3 of the tool main body 61c is also less than the radius of curvature r of the recessed shape in the fillet portion 39. The shank outer diameter Ds3 is smaller than the minimum outer diameter of the holder 67c. Therefore, the shank outer diameter Ds3 is the minimum outer diameter of the handle 65c. The shank outer diameter Ds3, that is, the minimum outer diameter of the handle 65c is smaller than the maximum outer diameter Dt3 of the tool main body 61c.

A dimensional relationship between the maximum outer diameters Dt of each of the tool main bodies 61a, 61b and 61c is as follows.

$$Dt1 \geq Dt2 \geq Dt3$$

Therefore, the maximum outer diameter Dt3 of the tool main body 61c of the residue-cutting tool 60c is basically the minimum among the maximum outer diameters Dt1, Dt2 and Dt3 of the tool main bodies 61a, 61b and 61c of the three types of cutting tools 60a, 60b and 60c. However, the maximum outer diameter Dt3 of the tool main body 61c of the residue-cutting tool 60c may be equal to the maximum outer diameter Dt2 of the tool main body 61b of the intermediate/finishing cutting tool 60b.

A dimensional relationship between the minimum outer diameters Ds of the respective handles 65a, 65b and 65c is as follows.

$$Ds1 \geq Ds2 > Ds3$$

Therefore, the minimum outer diameter Ds3 of the handle 65c of the residue-cutting tool 60c is the minimum among the minimum outer diameters Ds1, Ds2 and Ds3 of the handles 65a, 65b and 65c of the three types of cutting tools 60a, 60b and 60c.

Further, as illustrated in FIG. 8B, in the direction perpendicular to the tool axis line At3, an overhanging amount OH which is the distance from the outer peripheral surface (the outer peripheral surface of the shank 66c) of the minimum outer diameter portion of the handle 65c to the position of the maximum outer diameter among the outer periphery of the tool main body 61c is the maximum among the respective overhanging amounts of the plurality of tools 60a, 60b and 60c.

In this way, the overhanging amount OH of the residue-cutting tool 60c is maximized to perform the pull cutting process by the residue-cutting tool 60c. The pull cutting process is a method for moving the tool to the proximal end 68c side in the tool axial direction Dta, that is, to the tool rear side Dtb (see FIG. 15), while rotating the residue-cutting tool 60c about the tool axis line At3, thereby cutting a machining target. Therefore, the tool main body 61c of the residue-cutting tool 60c has a rear blade 62 in the direction including the tool rear side component. Therefore, in the tool main body 61c, a blade is formed in a range of 200° or more in a virtual plane including the tool axis line At3, and preferably, a blade is formed within a range of 240° or more.

The shape of the tool main body 61c of the residue-cutting tool 60c described above on the virtual plane including the tool axis line At3 is a circular segment shape. However, the shape of the tool main body 61c of the residue-cutting tool 60c may be a shape obtained by cutting one side of the minor axis of the ellipse, in the virtual plane including the tool axis line At3. Further, in the case where a cutting process is performed exclusively with the residue-cutting tool 60c, a blade may not be provided on the distal end side of the tool main body 61c of the residue-cutting tool 60c.

Figure 10:
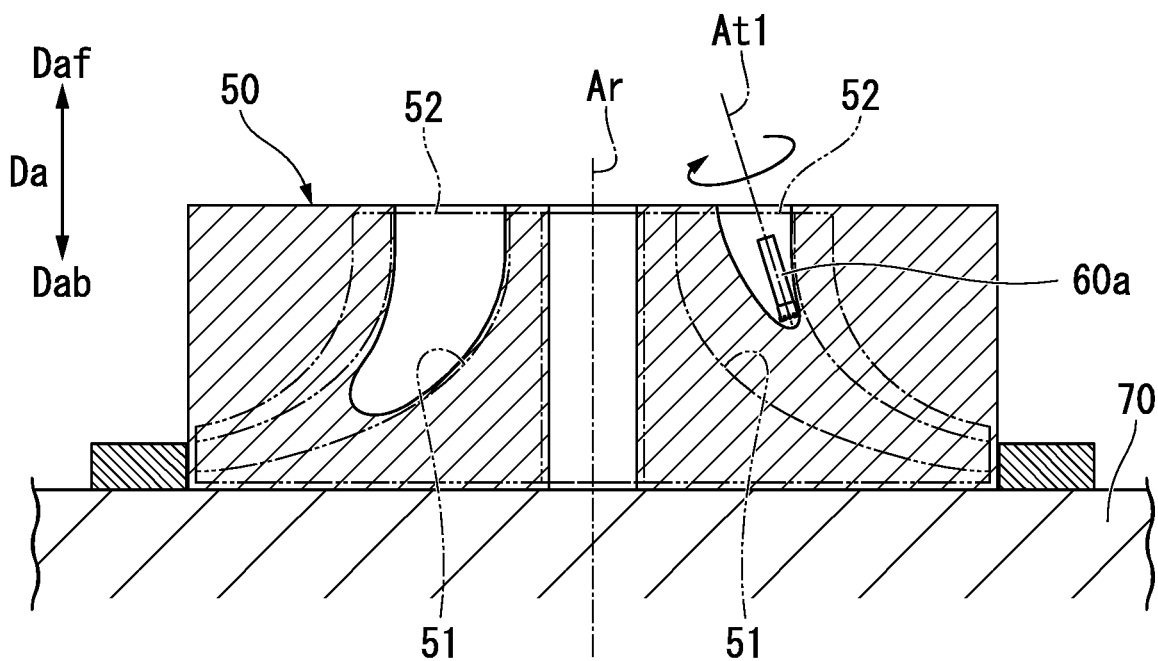
FIG. 10 is an explanatory view explaining a first rough cutting process according to one embodiment of the present invention.

In the flow path-cutting process (S12), first, the flow path region 51 in the intermediate block 50 is cut using the rough cutting tool 60a (S13: a rough cutting process). In the rough cutting process (S13), as illustrated in FIG. 10, the intermediate block 50 is set on the table 70 of the machine tool so that the axial direction rear side Dab of the intermediate block 50 faces downward. Further, the rough cutting tool 60a is attached to the chuck of this machine tool. Further, while the rough cutting tool 60a is rotated, the rough cutting tool 60a is inserted from the inlet region 52 of the intermediate block 50 toward the axial direction rear side Dab, and the flow path region 51 in the intermediate block 50 is cut (S13a: a first rough cutting process). In the first rough cutting process (S13a), the region on the inlet region 52 side in the flow path region 51 is cut.

Figure 11:
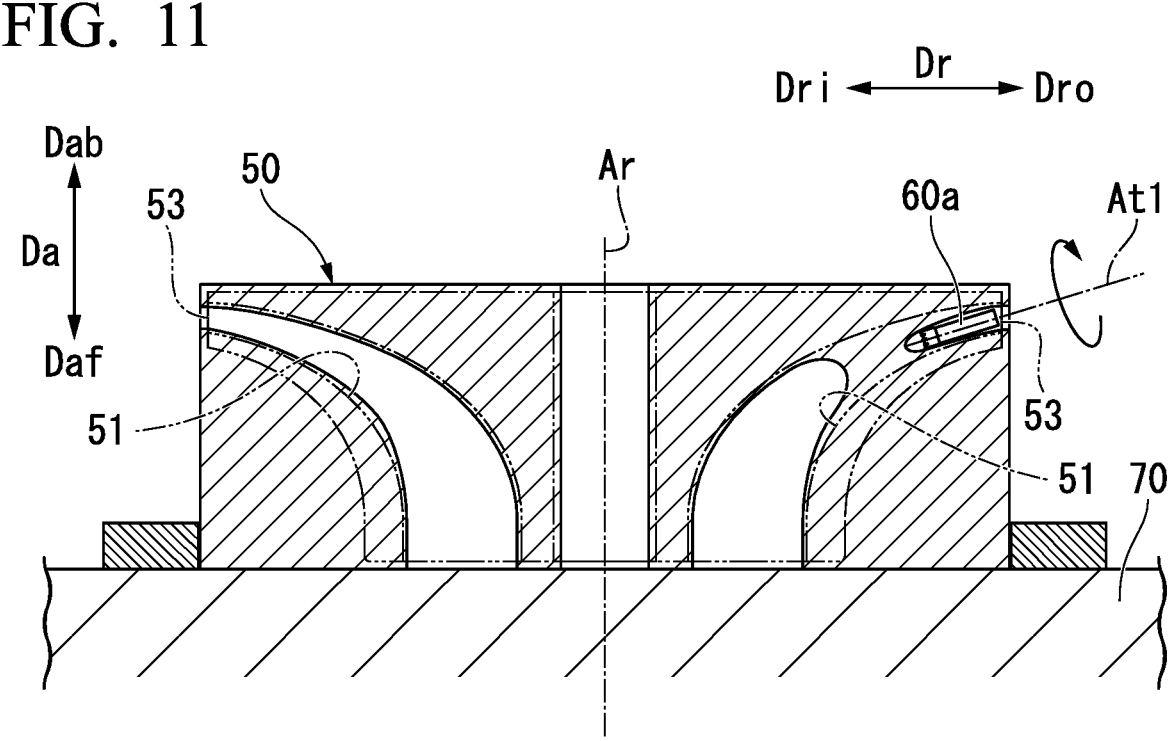
FIG. 11 is an explanatory view explaining a second rough cutting process according to one embodiment of the present invention.

In this rough cutting process (S13), after the first rough cutting process (S13a), as illustrated in FIG. 11, the intermediate block 50 is set on the table 70 of the machine tool so that the axial direction front side Daf of the intermediate block 50 faces downward. Further, while the rough cutting tool 60a is rotated, the rough cutting tool 60a is inserted from the outlet region 53 in the intermediate block 50 toward the radial direction inner side Dri, and the flow path region 51 in the intermediate block 50 is cut (S13b: a second rough cutting process). In the second rough cutting process (S13b), the region on the outlet region 53 side in the flow path region 51 is cut.

Thus, the rough cutting process (S13) is completed.

Figure 12:
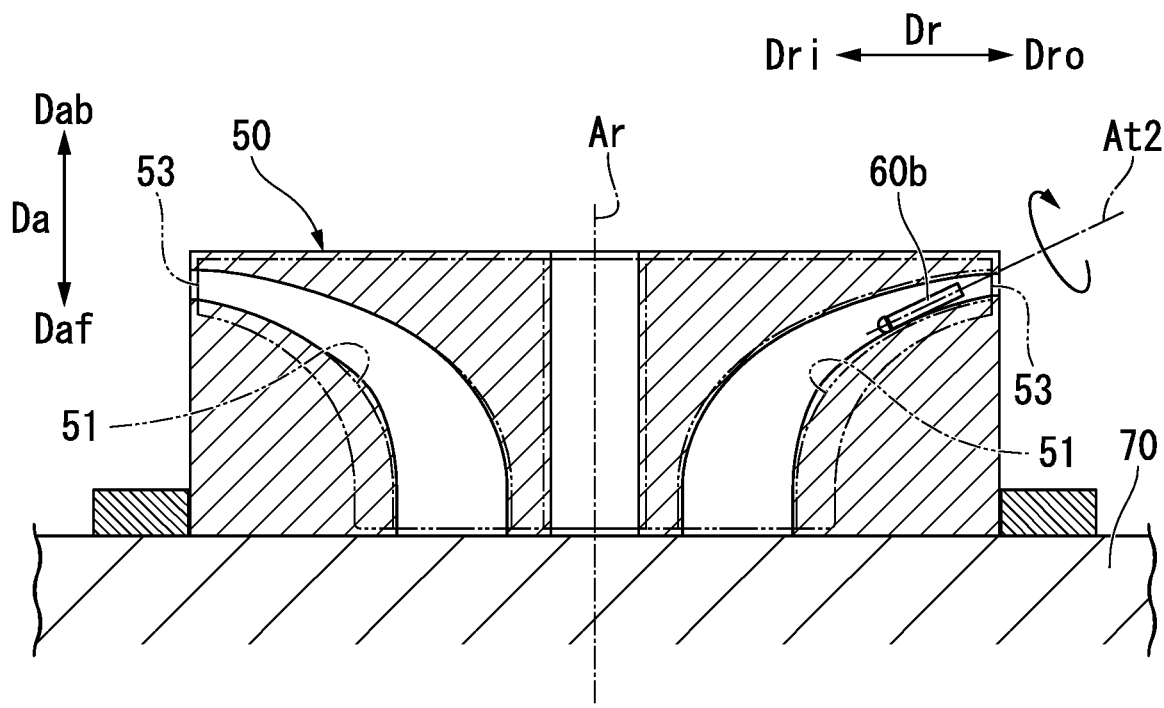
FIG. 12 is an explanatory view explaining a first intermediate/finishing cutting process according to one embodiment of the present invention.

Next, the portion remaining after the rough cutting process (S13) in the flow path region 51 is cut using the intermediate/finishing cutting tool 60b, (S14: an intermediate/finishing cutting process). In the intermediate/finishing cutting process (S14), as illustrated in FIG. 12, the intermediate/finishing cutting tool 60b is attached to the chuck of the machine tool. The intermediate block 50 remains set on the table 70 of the machine tool after the second rough cutting process (S13b), that is, with the axial direction front side Daf facing downward. Further, while the intermediate/finishing cutting tool 60b is rotated, the intermediate/finishing cutting tool 60b is inserted from the outlet region 53 in the intermediate block 50 toward the radial direction inner side Dri to cut the flow path region 51 in the intermediate block 50 (S14a: a first intermediate/finishing cutting process). In the first intermediate/finishing cutting process (S14a), the region on the outlet region 53 side of the portion remaining in the rough cutting process (S13) in the flow path region 51 is cut.

Figure 13:
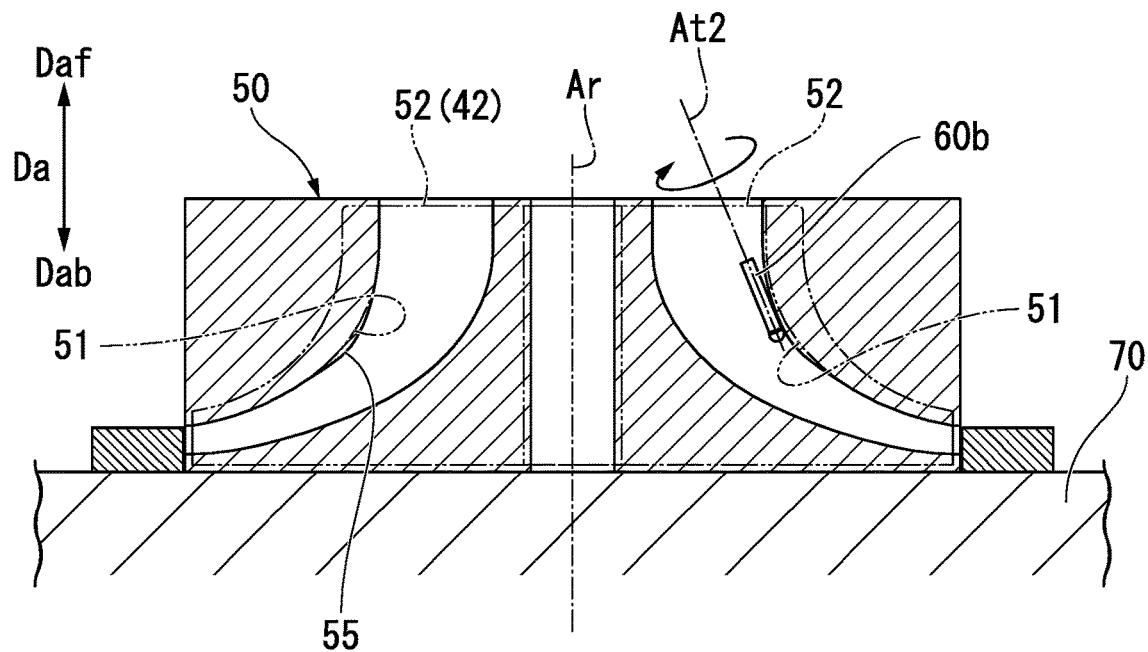
FIG. 13 is an explanatory view explaining a second intermediate/finishing cutting process according to one embodiment of the present invention.

In the intermediate/finishing cutting process (S14), as illustrated in FIG. 13, after the first intermediate/finishing cutting process (S14a), the intermediate block 50 is set on the table 70 of the machine tool so that the axial direction rear side Dab in the intermediate block 50 faces downward. Then, while the intermediate/finishing cutting tool 60b is rotated, the intermediate/finishing cutting tool 60b is inserted from the inlet region 52 in the intermediate block 50 toward the axial direction rear side Dab to cut the flow path region 51 in the intermediate block 50 (S14b: a second intermediate/finishing cutting process). In the second intermediate/finishing cutting process (S14b), the region on the inlet region 52 side of the portion remaining in the rough cutting process (S13) in the flow path region 51 is cut.

Thus, the intermediate/finishing cutting process is finished (S14).

Figure 14:
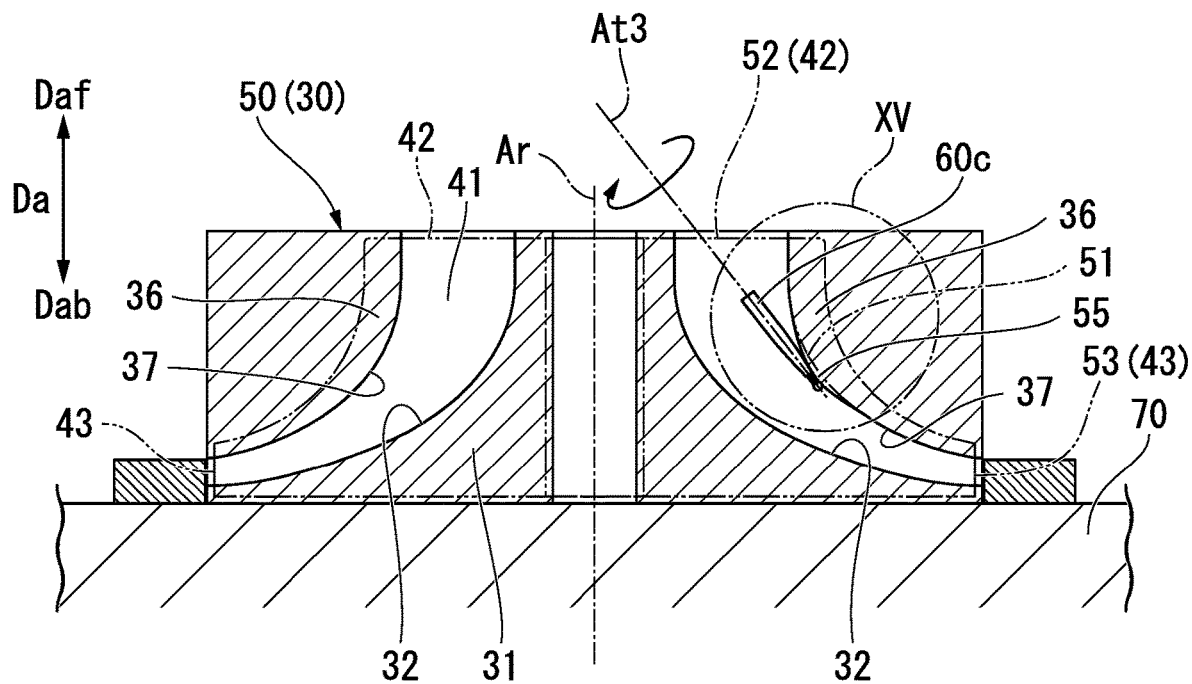
FIG. 14 is an explanatory view explaining a first residue-cutting process according to one embodiment of the present invention.
Figure 15:
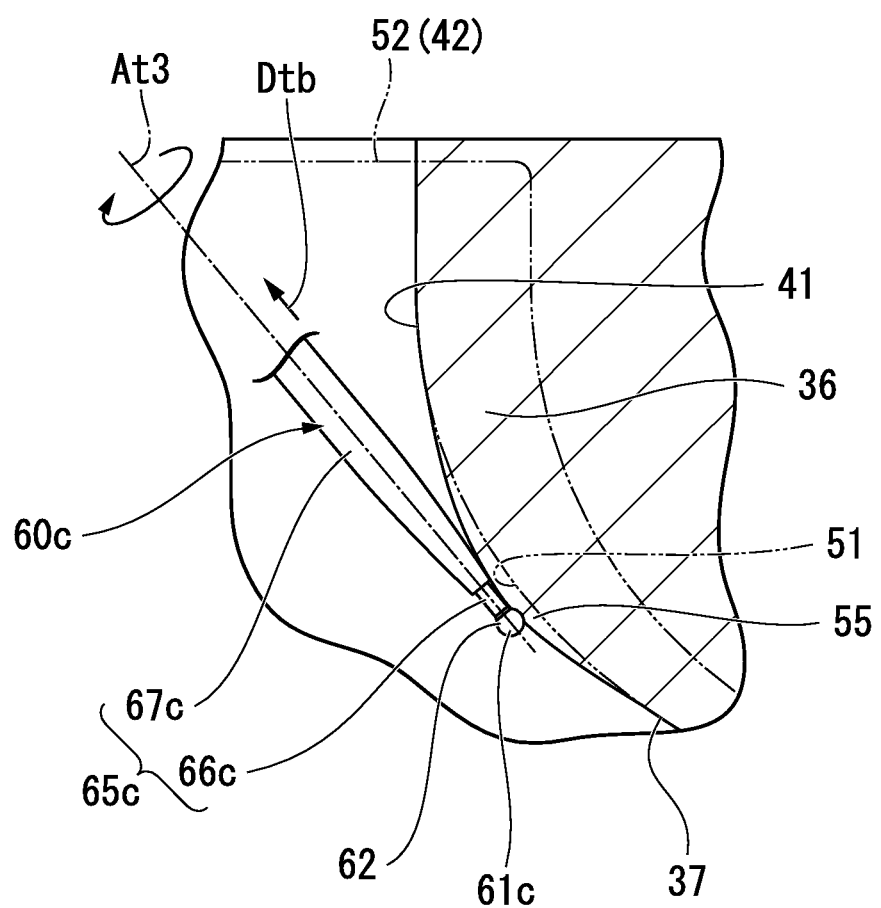
FIG. 15 is an enlarged view of a part XV in FIG. 14.

In both the rough cutting process (S13) and the intermediate/finishing cutting process (S14), processes (S13a, S14b) of inserting the tools 60a and 60b from the inlet region 52 of the intermediate block 50 toward the axial direction rear side Dab to cut the intermediate block 50, and processes (S13b, S14a) of inserting the tools 60a and 60b from the outlet region 53 of the intermediate block 50 toward the radial direction inner side Dri to cut the intermediate block 50 are executed. However, when the radius of curvature of bending of the impeller inner flow path 41 is relatively smaller than the opening area of the inlet 42 or the outlet 43, in some cases, the flow path region 51 may not be cut completely. Specifically, as illustrated in FIGS. 14 and 15, since the radius of curvature of the inner peripheral surface 37 of the cover 36 is smaller than the radius of curvature of the outer peripheral surface 32 of the disc 31 among the surfaces defining the impeller inner flow path 41, in some cases, in the intermediate portion between the inlet 42 and the outlet 43 of the inner peripheral surface 37 of the cover 36, a cutting residue 55 that cannot be cut in the rough cutting process (S13) and the intermediate/finishing cutting process (S14) may occur. Therefore, in the present embodiment, the residue-cutting process (S15) is executed after the intermediate/finishing cutting process (S14).

In the residue-cutting process (S15), as illustrated in FIGS. 14 and 15, the residue-cutting tool 60c is attached to the chuck of the machine tool. Further, the intermediate block 50 remains set on the table 70 of the machine tool after the second intermediate/finishing cutting process (S14b), that is, with the axial direction rear side Dab facing downward. While the residue-cutting tool 60c is rotated, the residue-cutting tool 60c is inserted from the inlet region 52 in the intermediate block 50 toward the axial direction rear side Dab, and the aforementioned cutting residue 55 is cut in the flow path region 51 in the intermediate block 50 (S15a: a first residue-cutting process). At this time, the residue-cutting tool 60c is moved back and forth in the direction in which the tool axis line At3 extends, and the cutting residue 55 is cut. That is, here, the pulling and cutting process and a butt-cutting process are alternately repeated by the residue-cutting tool 60c. At the time of the pulling and cutting process, the residue-cutting tool 60c is moved in the direction including the tool rear side Dtb component, and the cutting residue 55 is cut by the rear blade 62 of the residue-cutting tool 60c.

As described above, the tool main body 61c of the residue-cutting tool 60c has the largest overhanging amount OH among the three tools 60a, 60b, and 60c. Therefore, by the residue-cutting tool 60c, it is possible to perform the pulling and cutting process of the cutting residue 55 on the inner peripheral surface 37 of the cover 36 with a small radius of curvature. Further, as described above, the residue-cutting tool 60c basically has the smallest maximum outer diameter Dt3 of the tool main body 61c among the three tools 60a, 60b and 60c. Therefore, the fillet portion 39 of the impeller 30 can also be cut.

Even after executing the above first residue-cutting process (S15a), if the cutting residue 55 is present, the intermediate block 50 is set on the table 70 of the machine tool with the axial direction front side Daf of the intermediate block 50 facing downward. Further, while the residue-cutting tool 60c is rotated, the residue-cutting tool 60c is inserted from the outlet region 53 in the intermediate block 50 toward the radial direction inner side Dri, and the cutting residue 55 of the flow path region 51 in the intermediate block 50 is cut (S15b: a second residue-cutting process). Even in this case, the residue-cutting tool 60c is moved back and forth in the direction in which the tool axis line At3 extends, and the cutting residue 55 is cut.

Thus, the flow path-cutting process (12) is completed, and the impeller inner flow path 41 is formed in the intermediate block 50.

When the impeller inner flow path 41 is formed in the intermediate block 50, the intermediate block 50 is further processed (S16: a finishing process) to complete the impeller 30. In the finishing process (S16), heat treatment is performed on the intermediate block 50 in which the impeller inner flow path 41 is formed as necessary. Further, the outer periphery and the like of the intermediate block 50 are cut to form the outer peripheral surface 38 of the cover 36, and the back surface 33 of the disc 31 is formed. Further, a portion forming the shaft hole 34a of the intermediate block 50 is cut to form the shaft hole 34.

As described above, in the present embodiment, even when the radius of curvature of bending of the impeller inner flow path 41 in the impeller 30 is relatively smaller than the opening area of the inlet 42 or the outlet 43, it is possible to form the impeller inner flow path 41 in the intermediate block 50 using the residue-cutting tool 60c. Further, in the present embodiment, since the intermediate block 50 is cut using the rough cutting tool 60a and the intermediate/finishing cutting tool 60b in addition to the residue-cutting tool 60c, the cutting efficiency of the flow path region 51 can be enhanced.

Further, in the present embodiment, after the second rough cutting process (S13b), the first intermediate/finishing cutting process (S14a) is executed without resetting the intermediate block 50 on the table 70 of the machine tool. Further, after the first intermediate/finishing cutting process (S14a), the first residue-cutting process (S15a) is executed without resetting the intermediate block 50 on the table 70 of the machine tool. Therefore, it is possible to omit the labor of setting the intermediate block 50.

In the rough cutting process (S13), the intermediate/finishing cutting process (S14), and the residue-cutting process (S15), the intermediate block 50 may be set in a direction opposite to the aforementioned direction. Specifically, in the first rough cutting process (S13a), the axial direction front side Daf of the intermediate block 50 is set to face downward, and the rough cutting tool 60a is inserted from the outlet region 53 of the intermediate block 50. In the second rough cutting process (S13b), the axial direction rear side Dab of the intermediate block 50 is set to face downward, and the rough cutting tool 60a is inserted from the inlet region 52 of the intermediate block 50. In the first intermediate/finishing cutting process (S14a), the intermediate/finishing cutting tool 60b is inserted from the inlet region 52 of the intermediate block 50 with the axial direction rear side Dab of the intermediate block 50 set to face downward. In the second intermediate/finishing cutting process (S14b), the axial direction front side Daf in the intermediate block 50 is set to face downward, and the intermediate/finishing cutting tool 60b is inserted from the outlet region 53 of the intermediate block 50. In the first residue-cutting process (S15a), the residue-cutting tool 60c is inserted from the outlet region 53 of the intermediate block 50 with the axial direction front side Daf of the intermediate block 50 set to face downward. When the second residue-cutting process (15b) is executed according to necessity, the axial direction rear side Dab in the intermediate block 50 is set to face downward, and the residue-cutting tool 60c is inserted from the inlet region 52 of the intermediate block 50.

Further, the residue-cutting tool 60c uses a lollipop mill in which blades are formed in a range of 240° or more within a virtual plane including the tool axis line At3. However, in the case of performing only the pulling and cutting in the residue-cutting process (S15), as described above, there may be no blade on the distal end side of the tool main body 61c of the residue-cutting tool 60c.

In the above description, the rough cutting process (S13) using the rough cutting tool 60a, the intermediate/finishing cutting process (S14) using the intermediate/finishing cutting tool 60b, and the residue-cutting process (S15) using the residue-cutting tool 60c) are executed. However, in some cases, the intermediate/finishing cutting process (S14) may be omitted.

Further, the above embodiment is a method for manufacturing the impeller 30 of the centrifugal multi-stage compressor. However, in the present invention, the centrifugal rotary machine is not required to have multiple stages, and may have a single stage. Further, the present invention is not limited to the impeller 30 of the centrifugal compressor. For example, an impeller of a centrifugal pump, which is one type of centrifugal rotary machine, may be manufactured by the same method as described above.

INDUSTRIAL APPLICABILITY

According to one embodiment of the present invention, even when the radius of curvature of bending of the flow path in the closed impeller is relatively smaller than the opening area of the inlet or the outlet, a flow path can be formed in the block for manufacturing the impeller.

REFERENCE SIGNS LIST

10 Rotary shaft
11 Radial bearing
12 Thrust bearing
20 Casing
21 Suction flow path
22 Discharge flow path
23 Intermediate flow path
30 Impeller
31 Disc
32 Outer peripheral surface
33 Back surface
34, 34a Shaft hole
35 Blade
36 Cover
37 Inner peripheral surface
38 Outer peripheral surface
39 Fillet portion
41 Impeller inner flow path
42 Inlet
43 Outlet
50 Intermediate block
51 Flow path region
52 Inlet region
53 Outlet region
55 Cutting residue
60a Rough cutting tool
60b Intermediate/finishing cutting tool
60c: Residue-cutting tool
61a, 61b, 61c: Tool main body
62: Rear blade
65a, 65b, 65c Handle
66a, 66b, 66c Shank
67a, 67b, 67c Holder
68a, 68b, 68c Proximal end
70 Table
Ar Axis line
At1, At2, At3 Tool axis line
Da Axial direction
Dab Axial direction rear side
Daf Axial direction front side
Dc Circumferential direction
Dr Radial direction
Dri Radial direction inner side
Dro Radial direction outer side
Dta: Tool axial direction
Dtb Tool rear side
OH Overhanging amount

The invention claimed is:

1. A method for manufacturing an impeller of a centrifugal rotary machine in which the impeller is formed from one block, the impeller having a disc-shaped disc around an axis line; a plurality of blades disposed on an outer peripheral surface of the disc to be spaced apart from each other in a circumferential direction with respect to the axis line; and a cover which sandwiches the plurality of blades between the disc and the cover, a flow path being formed between the disc and the cover and between the plurality of blades, the flow path causing fluid flowing in from an axial direction front side which is one side in an axial direction in which the axis line extends, to flow outward in a radial direction with respect to the axis line, the method comprising:
   executing a flow path-cutting process of cutting a flow path region serving as the flow path in the block using a plurality of types of tools that are different from each other;
   wherein
   the flow path-cutting process comprises:
      a rough cutting process of cutting using a rough cutting tool which is one of the plurality of tools;
      an intermediate/finishing cutting process of cutting a cutting residue in the rough cutting process using an intermediate/finishing cutting tool which is one of the plurality of tools after the rough cutting process; and a residue-cutting process of cutting the cutting residue in the rough cutting process using a residue-cutting tool which is one of the plurality of tools, wherein the rough cutting process comprises:
- a first rough cutting process of cutting the flow path region by inserting the rough cutting tool into the block from one of:
  - an inlet region in the block serving as an inlet through which the fluid flows in the impeller, and
  - an outlet region in the block serving as an outlet from which the fluid flows out in the impeller; and
- a second rough cutting process of cutting the flow path region by inserting the rough cutting tool into the block from the other region among the outlet region and the inlet region after the first rough cutting process, the intermediate/finishing cutting process comprises:
- a first intermediate/finishing cutting process of cutting the flow path region by inserting the intermediate/finishing cutting tool into the block from the other region in the block after the second rough cutting process; and
- a second intermediate/finishing cutting process of cutting the flow path region by inserting the intermediate/finishing cutting tool into the block from the one region in the block after the first intermediate/finishing cutting process, the residue-cutting process comprises:
- cutting the cutting residue in the intermediate/finishing cutting process after the intermediate/finishing cutting process; and
- a first residue-cutting process of cutting the flow path region by inserting the residue-cutting tool into the block from the one region in the block after the second intermediate/finishing cutting process, each of the plurality of tools used in the flow path-cutting process has:
- a tool main body having a blade formed at least on an outer periphery around a tool axis line; and
- a handle to which the tool main body is fixed, and which is long in a tool axis direction in which the tool axis line extends, around the tool axis line, a maximum outer diameter of the tool main body in the residue-cutting tool is larger than a minimum outer diameter of the handle in the residue-cutting tool, the tool main body in the residue-cutting tool has a rear blade directed in a direction including a tool rear side component which is a side of the handle with respect to the tool main body in the residue-cutting tool.

2. The method according to claim 1, wherein the residue-cutting process further comprises a process of cutting the cutting residue in the rough cutting process by the rear blade of the residue-cutting tool by moving the residue-cutting tool in a direction including the tool rear side component while rotating the residue-cutting tool.

3. The method according to claim 1, wherein an overhanging amount, which is a distance from an outer peripheral surface at a position which is a minimum outer diameter of the handle to a position having a maximum outer diameter of the outer periphery of the tool main body in a direction perpendicular to the tool axis line, is maximum in the residue-cutting tool among the plurality of tools.

4. The method according to claim 1, wherein the minimum outer diameter of the handle is minimum in the residue-cutting tool among the plurality of tools.

5. The method according to claim 1, wherein the maximum outer diameter of the tool main body is minimum in the residue-cutting tool among the plurality of tools.

6. The method according to claim 1, wherein the tool main body of the residue-cutting tool has the blade formed in a range of 200° or more within a virtual plane including the tool axis line.

7. The method according to claim 1, wherein the tool main body of the residue-cutting tool has the blade formed in a range of 240° or more within a virtual plane including the tool axis line.

8. The method according to claim 1, wherein the minimum outer diameter of the handle in the intermediate/finishing cutting tool is equal to or less than the minimum outer diameter of the handle in the rough cutting tool.

9. The method according to claim 1, wherein the maximum outer diameter of the tool main body in the intermediate/finishing cutting tool is equal to or less than the maximum outer diameter of the tool main body in the rough cutting tool.

10. The method according to claim 1, wherein the intermediate/finishing cutting tool is a ball end mill.

11. The method according to claim 1, wherein the rough cutting tool is a radius end mill.

12. The method according to claim 1, wherein the residue-cutting tool is a spherical segment-shaped mill.

13. A method for manufacturing a centrifugal rotary machine, the method comprising:
- executing the method according to claim 1;
- executing a preparation process of preparing a component including:
  - a rotary shaft which is configured to be mounted on the impeller afterward and which extends around the axis line; and
  - a casing which covers the impeller; and
- executing an assembling process of combining the impeller and the component including:
  - the rotary shaft; and the casing.

* * * * *